United States Patent [19]

Baum et al.

[11] 3,852,288

[45] Dec. 3, 1974

[54] PROCESS FOR COLOR STABLE ALKYL AND ALKENYL ACID PHOSPHATE COMPOSITIONS

[75] Inventors: Arthur A. Baum, Wilmington, Del.; Leonard A. Rothman, Brooklyn, N.Y.

[73] Assignee: E. I. du Pont de Nemours and Company, Wilmington, Del.

[22] Filed: Oct. 11, 1972

[21] Appl. No.: 296,566

Related U.S. Application Data

[63] Continuation-in-part of Ser. No. 67,581, Aug. 27, 1970, abandoned.

[52] U.S. Cl.. 260/247.7 D, 117/139.5 CQ, 260/923
[51] Int. Cl.............................................. C07d 87/32
[58] Field of Search...................... 260/247.7 D, 923

[56] References Cited
UNITED STATES PATENTS

| | | | |
|---|---|---|---|
| 1,973,724 | 9/1934 | Perkins et al. | 23/250 |
| 2,005,619 | 6/1935 | Graves | 260/99.20 |
| 2,676,122 | 4/1954 | McCarthy | 117/139.5 |
| 2,701,258 | 2/1955 | Brown et al. | 260/461 |
| 2,742,379 | 4/1956 | Schofield | 117/138.8 |
| 2,901,513 | 8/1959 | Thomas | 260/584 |
| 3,048,543 | 8/1962 | Thomas et al. | 252/51.5 |
| 3,359,315 | 12/1967 | Kosak | 260/575 |
| 3,505,044 | 4/1970 | Bartlett et al. | 44/72 |
| 3,516,922 | 6/1970 | Anzilotti | 208/47 |

FOREIGN PATENTS OR APPLICATIONS

| 875,151 | 8/1961 | Great Britain |
|---|---|---|

OTHER PUBLICATIONS

Kroger, Chem. Abstracts 44: 1685c (1950).
Okita, Chem. Abstracts 46: 1793f (1952).
Okita, Chem. Abstracts 48: 9737h (1954).
Ripley, Chem. Abstracts 73: 67760y (1970).
Vis et al., Can. J. Chem. 67: 1582–1587 (1969).

*Primary Examiner*—G. Thomas Todd
*Attorney, Agent, or Firm*—James A. Costello

[57] ABSTRACT

Disclosed herein are color stable compositions of alkyl and alkenyl acid phosphates and various salts thereof and from about 0.001 to 0.02% by total weight of a color stabilizing hydrazine having the formula

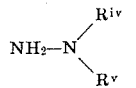

wherein each of $R^{iv}$ and $R^v$ is independently H or an alkyl group having from 1 to 4 carbon atoms, the improvement being in the hydrazine component of the composition. Also disclosed is the process for preparing these compositions by reacting a $C_4$–$C_{18}$ alcohol with phosphorus pentoxide and, optionally, a salt-forming reactant, and the appropriate hydrazine. The compositins are useful, inter alia, as textile antistatic agents.

2 Claims, No Drawings

PROCESS FOR COLOR STABLE ALKYL AND ALKENYL ACID PHOSPHATE COMPOSITIONS

CROSS-REFERENCE TO RELATED APPLICATION

This application is a continuation-in-part of copending application Ser. No. 67,581, filed on Aug. 27, 1970 now abandoned.

BACKGROUND OF THE INVENTION

1. Field of the Invention

This invention relates to compositions of, and process for, $C_4$ to $C_{18}$ alkyl or alkenyl acid phosphates and salts thereof, wherein the improvement comprises, combined therewith, from about 0.001 to 0.02%, by total weight, of a hydrazine having the formula

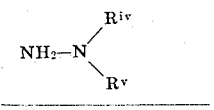

wherein each of $R^{iv}$ and $R^v$ is independently H or an alkyl group having from 1 to 4 carbon atoms.

2. Description of the Prior Art

Perkins et al. in U.S. Pat. No. 1,973,724 teach a method of treating aromatic amines and monohydric phenols with a hydrazine compound such as hydrazine, hydrazine hydrate, semicarbazide, etc., to inhibit discoloration of these compounds on exposure to light and/or air.

Kosak in U.S. Pat. No. 3,359,315 discloses an improved process for reducing aromatic nitro compounds to aromatic amines by reacting the crude reaction mixture product with hydrazine to effect an improvement in coloration and color stability. During this process the hydrazine is completely decomposed and no hydrazine compound is found in the finished aromatic amine.

Schofield in U.S. Pat. No. 2,742,379 and McCarthy in U.S. Pat. No. 2,676,122 disclose textile antistatic agents prepared by neutralizing acid esters of phosphoric acid with diethanolamine. The resulting antistatic agents contain no hydrazine or suggestion thereof.

SUMMARY OF THE INVENTION

The present invention concerns color stable compositions of alkyl and alkenyl acid phosphates and salts thereof that are rendered color stable by inclusion therein of from about 0.001 to 0.02%, by total weight, of a hydrazine.

In a known composition selected from the group consisting of

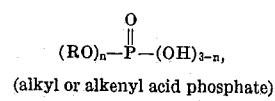

(alkyl or alkenyl acid phosphate)

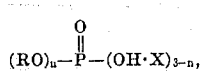

(amine salt of alkyl or alkenyl acid phosphate)

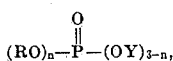

(sodium, potassium or lithium salt of alkyl or alkenyl acid phosphate)

and mixtures thereof wherein
R is an alkyl or alkenyl group having from 4 to 18 carbon atoms,
n is 1 or 2,

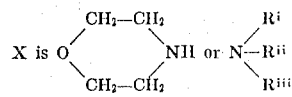

wherein $R^i$, $R^{ii}$ and
$R^{iii}$ are selected from —H, —$CH_3$, —$C_2H_4OH$ or —$C_3H_6OH$ with no more than 2 of $R^i$, $R^{ii}$, and $R^{iii}$ being —H or $CH_3$, and
Y is selected from sodium, potassium and lithium, the improvement comprises, combined therewith, from about 0.001 to 0.2%, by total weight, of a hydrazine having the formula

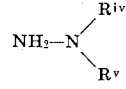

wherein each of $R^{iv}$ and $R^v$ is independently H or an alkyl group having from 1 to 4 carbon atoms.

The novel process step is to react the hydrazine with the alkyl and alkenyl acid phosphate reactants, the acid phosphate or their salts. The term "react" is meant in its broadest sense to include the intimate contact and combination of the hydrazine with the acid phosphate, the reactants therefor (the alcohol(s) and phosphorus pentoxide), and the acid phosphate salt(s). In a process for preparing alkyl and alkenyl acid phosphates, and salts thereof, by reacting a $C_4$ to $C_{18}$ alcohol, or mixture of alcohols, with phosphorus pentoxide, to form acid phosphates, and reacting the acid phosphate formed thereby with a member selected from the group of salt-forming reactants consisting of sodium, potassium and lithium hydroxides, and an amine of the formula

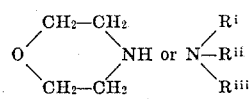

wherein
$R^i$, $R^{ii}$ and $R^{iii}$ are selected from —H, —$CH_3$, —$C_2H_4OH$ or —$C_3H_6OH$ with no more than 2 of $R^i$, $R^{ii}$, and $R^{iii}$ being —H or $CH_3$,
to form the corresponding salt of the acid phosphate, the improvement comprises reacting additionally with the acid phosphate reactants, the acid phosphate or the salts thereof, a hydrazine of the formula

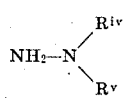

wherein each of $R^{iv}$ and $R^v$ is independently H or an alkyl group having from 1 to 4 carbon atoms, to produce the color stable compositions of this invention.

DETAILS OF THE INVENTION

Alkyl and alkenyl acid phosphates are commonly prepared by reacting an alcohol having from about 4 to 18 carbon atoms, or a mixture of such alcohols, with phosphorus pentoxide, for instance, as taught in coassigned U.S. Pat. No. 3,516,922. The reaction can be conducted at a temperature between about 0°C. and 100°C. and at atmospheric pressure. The phosphorus pentoxide and the alcohol(s) are normally mixed below about 40°C. The molar ratio of alcohol to phosphorus pentoxide is not critical but is normally about 3:1. The reaction is exothermic. Cooling or heating of the reactants may be necessary, however, depending upon the particular alcohol(s) used and the method used to contact the reactants.

Among the alcohols useful in the present invention are saturated and unsaturated aliphatic straight and branched chain monohydric alcohols having from about 4 to about 18 carbon atoms (see for example U.S. Pat. No. 3,505,044). They may be natural, i.e., available from such sources as tallow, coconut oil, etc., or synthetic, i.e., produced for example by the Ziegler or other processes.

Phosphorus dentoxide is a widely used commercial chemical which may be made by burning phosphous in an excess of air or oxygen.

The acid phosphates in the form of esters and diesters are then separated from any unreacted starting material. The phosphate mono- and diester mixture can then be neutralized with the salt-forming reactants, for example, alkali metal hydroxide or carbonate (e.g., sodium, potassium or lithium), an alkanol amine or morpholine (as in, for example, coassigned U.S. Pat. No. 3,505,044). This procedure while simple to perform often results in dark colored products. Such products include the alkyl and alkenyl phosphoric acids, $(RO)_n$-$PO(OH)_{3-n}$, the amine salts of such phosphoric acids, $(RO)_nPO[OH \cdot X]_{3-n}$, where X is one of the hereinbefore defined amines, and the sodium, potassium and lithium salts, $(RO)_n$—$PO(OY)_{3-n}$. In the amine salts, OH·X represents the amine salt; it could also be written $[O^-HX^+]$ where $HX^+$ is, for example

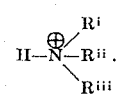

Whether the reaction mixture is neutralized or not the reaction product will often acquire an amber or brownish color days or possibly even weeks after packaging of the product. It is, however, recognized that for certain uses such as antistatic treatment of textile fibers, a product is required that does not impart an undesired coloration to the textile fabric treated therewith and that prevents discoloration after treatment with the acid phosphate product.

It has now been discovered that the inclusion of a small amount of a hydrazine in the reaction mixture during the reaction either causes the reaction products to lighten in color and retain the lighter color, or, insures that they do not darken, thus effecting an end product which is color stable. No absolute standard of color stability can be formulated and the color stability is relative to the color instability in the absence of the hydrazine component. The end product is an intimate combination of phosphate and/or phosphate salt plus hydrazine. The most effective method for the incorporation of the hydrazine into the reaction and consequently into the reaction product is by introducing said hydrazine (preferably as hydrazine hydrate) into the alcohol or mixture of alcohols before the addition of the phosphorus pentoxide.

Addition of the hydrazine (hydrazine hydrate) after the phosphorus pentoxide has been added to the alcohol(s) or after salt formation (i.e., after neutralization if effected), likewise stabilizes the coloration of the starting products but not as well as when the hydrazine is present with the alcohol before the addition of the phosphorus pentoxide. The hydrazine or hydrazine hydrate may be added at the normal reaction temperatures described previously but if the hydrazine or hydrazine hydrate is added to the alcohol or mixture of alcohols before the addition of the phosphorus pentoxide, the temperature at which it is added is preferably below 40°C. The amount of hydrazine used will be readily determined by one skilled in the art depending upon the particular alcohol or mixture of alcohols used. With the common commercial alcohols such as those described in the Examples following, the hydrazine should be used in an amount of from about 0.01 to 0.1% of the alcohol weight. Even larger amounts may, however, be used when there would be no objection to their presence in the end product.

Hydrazine is a widely used and commonly available commercial chemical. While it can be obtained as a pure compound in cylinders and may be used as such, it is normally sold and utilized due to ease of handling as an 85% hydrazine hydrate solution in water, the actual amount of $N_2H_4$ in 85% hydrazine hydrate being 54.4% of the net weight. The alkyl hydrazines, such as methyl hydrazine are prepared from alkyl sulfates, an excess of hydrazine and a base.

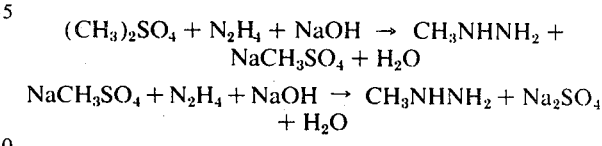

Methods for preparing various hydrazines are given in "Organic Chemistry" by F. C. Whitmore, published by D. Van Nostrand Co., Inc., New York, N.Y., in 1937, on pages 201–204.

In addition to hydrazine itself, benefit to color maintenance is aided by incorporation of other alkyl substituted, free amino group containing hydrazines, such as methyl hydrazine, ethyl hydrazine, 1,1-diethyl hydrazine, butyl hydrazine, and 1-ethyl-1-methyl hydrazine.

Among the neutralizing agents which may be utilized in the present invention are diethanolamine, monoethanolamine, triethanolamine, dimethylethanolamine, methyldiethanolamine, propanolamine, dipropanolamine, methyldipropanolamine, tripropanolamine, morpholine, and sodium and potassium hydroxides and carbonates. The preferred neutralizing agents are diethanolamine, morpholine, and sodium and potassium hydroxides.

The following method of analysis is used for determining the presence and amount of hydrazine in the color stable composition. Acidified p-dimethylaminobenzaldehyde is added to a methanol-benzene solution of the salt product (50% by volume methanol, 50% by volume benzene) at 55° to 60°C. This reacts with the hydrazine to form a hydrazone. The absorbance at 462 mμ as measured with a spectrophotometer is a measure of the hydrazine content. The basic method is found in Snell, "Colorimetric Methods of Analysis," Volume IIA, page 707 (1950) Third Edition, published by Van Nostrand and Co. In the present invention residual hydrazine content indicated by the above anaysis may be from at least 0.001 to as much as 0.02% by weight. It should be appreciated that the upper limit is a practical limit and amounts in excess thereof can be employed but with no practical advantages to be gained thereby. Preferably hydrazine content values of about 0.001% of the total composition by weight are obtained.

The color of samples is determined by measuring light transmittancy at a wavelength of from about 400–410 m$\mu$ with a spectrophotometer. Very light colored samples are measured undiluted, using distilled water as reference liquid. Samples normally having slight yellow or amber color are diluted with a suitable solvent or solvent mixture (petroleum fractions, polyethylene glycol monolaurate, isopropyl alcohol, etc.) and light transmittance measured using the diluent as reference.

UTILITY

All of the novel compositions are useful as antistatic agents. Examples 1 and 2 illustrate how to use the compositions in the antistatic treatment of textiles. The compositions of this invention are also useful as surfactants, and mold release agents for plastics. Regarding mold release activity, inclusion of about 0.1 to 0.4% by weight of a composition made according to Example 3 or Example 5, in an epoxy or polyester resin mix, before curing, promotes the easy release of the cured resin articles from the mold.

DESCRIPTION OF THE PREFERRED EMBODIMENTS

The following Examples are meant to illustrate but not to limit the invention. Unless otherwise indicated, all quantities are by weight.

There are many reasons why percent light transmittances might vary among similar or similarly prepared compositions (with or without the hydrazine component). The light transmittance values presented hereafter are as indicated for the products of the particular Examples in which the values are presented. Comparisons are valid only for compositions (with and without the hydrazine) set out in the same Example.

Nothing in these Examples is meant to imply that an improvement in color, evidenced by increased light transmittance, is always achieved with the hydrazines of this invention. Rather, the expression "color stable" applied with reference to the compositions of the invention includes compositions that are lighter in color than corresponding compositions but without the hydrazine, and, compositions which although no lighter in color than corresponding compositions without the hydrazine, are such that their color will not darken as would happen without the hydrazine component.

EXAMPLE 1

A mixture was prepared of 240.3 grams of a mixture of saturated aliphatic alcohols containing about 4% $C_6$ alcohol, 56% $C_8$ alcohol and 39% $C_{10}$ alcohol; and 59.7 grams of a mixture of alcohols containing about 0.5% $C_{10}$ alcohol, 66% $C_{12}$ alcohol, 26% $C_{14}$ alcohol and 6.5% $C_{16}$ alcohol. This mixture was placed in a glass flask equipped with thermometer and agitator, and swept with dry nitrogen gas. Then 0.12 gram of 85% hydrazine hydrate was added and, with the temperature adjusted and maintained at 45°–50°C., 95.1 grams of phosphorus pentoxide were added gradually over a period of 1-½ hours. The temperature was then raised to 60°–65°C. and held overnight (about 16 hours). At 60°–70°C. 155 grams of diethanolamine were added to neutralize the remaining acidity, and the product cooled to about 25°C.

A diluted sample of the product was prepared by dissolving 50 g. of the product in 25 g. of isopropyl alcohol and 15 ml. of water. Color was evaluated by measuring light transmittancy of the diluted sample compared with a sample of the diluent. The measurement was made with a Cenco-Sheard-Sanford "Photolometer" using a blue filter No. 87309-A (about 405 millimicrons) and a 1 centimeter cell. Light transmittance of the diluted sample from the hydrazine treated mixture was 99%.

When the preparation was repeated in the same manner with the same materials except that the hydrazine hydrate was omitted, light transmittancy of a similarly diluted sample was 84%. Analysis indicated 0.0009% hydrazine present. The analysis utilized consisted of adding acidified p-dimethylaminobenzaldehyde to a methanol-benzene solution of the product. This reacts with the hydrazine to form a hydrazone. The absorbance at 462 millimicrons is the measure of the hydrazine content.

Products manufactured according to the above process have value as anti-static agents for textile fibers and yarns. Textile fibers bearing deposits of about 0.1 to 0.5% of the fiber weight of the product reject the build-up of static charges thereon and dissipate such charges more rapidly than do untreated fibers. A suitable test for static electricity build-up is that of the American Association of Textile Chemists and Colorists designated AATCC Test 76-1964.

When a 30 sq. cm. piece of woven nylon fabric is soaked in a 1% aqueous dispersion of a product made as described in this Example and then wrung out and dried at 250°F. (121°C.) to leave 0.5% of the product on the fabric, the electric resistivity is about 30 × 10$^8$ ohms measured at 25% relative humidity and 70°F. (21°C.). The same cloth without the deposit has a resistivity under the same conditions of >150,000 × 10$^8$ ohms.

EXAMPLE 2

In a suitable flask were placed 112.6 grams of technical grade lauryl alcohol and 0.04 gram of 85% aqueous hydrazine hydrate. The charge was swept with dry nitrogen to eliminate oxygen and to keep moisture out of the vessel. The mixture was heated to 100°–105°C. for one hour and cooled to about 70°C., then 41.4 grams of phosphorus pentoxide were added gradually over 2½ hours. Temperature was then raised to 80°C. and held for 18 hours. The charge was filtered to remove solid (excess $P_2O_5$). In another flask 29.1 grams of diethanolamine were swept with dry nitrogen, then heated to about 75°C. and 63.2 grams of the alcohol-phosphate-hydrazine mixture were added, keeping temperature at about 75°C. The mixture was neutral, having a pH of about 7.5. When the color of a diluted sample was evaluated as in Example 1, light transmitttance of a sample was 32% and the percent hydrazine found by analysis as in Example 1 was 0.0009%.

The experiment was repeated three times, adding varying amounts of hydrazine hydrate, with the following results:

| g. hydrazine hydrate (85%) | light transmittance | % hydrazine present |
|---|---|---|
| .11 | 45% | .0024% |
| .22 | 80% | .005% |
| .54 | 92% | .012% |

When an equimolar amount of n-butyl, isobutyl, n-amyl or n-octyl alcohol is used in place of the lauryl alcohol of Example 2 above, similar color improvement is attained.

Products manufactured according to the process of this Example also can be used as anti-static agents on textile fibers. When prepared and tested as described in Example 1, resistivities of about $50 \times 10^8$ ohms are found for fibers treated with such products at the 0.5% on weight of fiber level.

EXAMPLE 3

In a suitable vessel were placed 593 g. isobutyl alcohol and 0.2 g. of 85% hydrazine hydrate aqueous solution. To the agitated mixture were added gradually 568 grams of phosphorus pentoxide, allowing the temperature to rise from room temperature to 80°–85°C. After the oxide was added the reaction mass was stirred at 80°–85°C. for 3 hours. After cooling to about 30°C., the charge was filtered through clean cheesecloth. The liquid had a yellowish tinge. Light transmission at 575 m$\mu$ was 84% without dilution.

When the above experiment was repeated without any hydrazine hydrate addition, light transmission was 62%.

EXAMPLE 4

The procedure of Example 1 was followed using 123.1 grams of the $C_8$–$C_{14}$ alcohol mixture and 36 grams of phosphorus pentoxide. The resulting mixture was filtered, then neutralized with 44.5 grams of moropholine. Light transmittance of a diluted sample without adding hydrazine hydrate was 95%. In a duplicate experiment, when 0.05 grams of 85% hydrazine hydrate were added before adding the phosphorus pentoxide to the alcohol mixture, a diluted sample of the final product had an increased light transmittance of 99%. Analysis as in Example 1 shows 0.0012% hydrazine present.

EXAMPLE 5

Into a suitable flask were placed 62.0 grams of 1-octanol, 36.6 grams of 1-decanol and 24.5 grams of an alcohol mix containing about 62% 1-dodecanol, 25% 1-tetradecanol and 12% hexadecanol. The flask was swept with dry nitrogen, then 36.0 grams of phosphorus pentoxide were added over 1 hour as the temperature was allowed to rise from 30°C. to 48°C. The mixture was stirred at 45°–50°C. for one-half hour and at 50°–52°C. for 1 hour, and finally for about 18 hours at 60°–65°C. The light transmittance of an undiluted non-hydrazine containing sample was 61%. The experiment was repeated using various amounts of hydrazine hydrate as in Example 1 with the following results:

| g. hydrazine hydrate (85%) | light transmittance | % hydrazine present |
|---|---|---|
| .03 | 61% | 0.0009% |
| .06 | 76% | 0.0018% |
| 0.3 | 87% | 0.01% |

EXAMPLE 6

An amount of 112.6 g. of a mixture of $C_{12}H_{25}OH$ and $C_{14}H_{29}OH$ was added to a flask and swept with nitrogen gas. Then, 0.03 g. of methyl hydrazine was added. The mixture was stirred and heated to 20°C., then 41.4 g. of phosphorus pentoxide was added over 45 minutes. Temperature was held below 80°C. while adding the phosphorus pentoxide, and was then held overnight (16 hours) at 80°C. ± 3°C. A slight reddish tint was observed in the filtered product. Five grams of the filtered product was diluted with 10 ml. of isopropyl alcohol and light transmittance measured at 400 mm. wave length in a Cenco Photolometer. Transmittance was 67.0%. When the experiment was duplicated without addition of methyl hydrazine, the light transmittance was 39%.

EXAMPLE 7

Preparation of Phosphate Ester Salt

Into a one liter flask there were weighed 217 grams of commercial octyl alcohol and 0.045 grams of 85% aqueous hydrazine hydrate. The charge was blanketed with nitrogen and heated to 45°C., then 85 grams of phosphorus pentoxide were added gradually over about 30 minutes. A temperature of 45°–55°C. was maintained during the addition by external cooling. After all of the phosphorus pentoxide had been added, the temperature was raised to 60°–65°C. and maintained at that level for 10 hours. After cooling slightly, 280 grams of the phosphation mass was transferred to a one liter flask, 20 ml. of distilled water was added and temperature again raised to 60°–65°C. Then 170 grams of 45% aqueous potassium hydroxide solution was added slowly and steadily over about 30 minutes with temperatures at 60°–70°C. The potassium hydroxide used brought pH to the desired point, 7.5–8.0. The solid content was adjusted to 69–71% by adding water.

The light transmittance of a solution of 50 grams of the above product in 25 grams of isopropyl alcohol and 15 grams of distilled water was 98% as measured at 25°C. at 400 millimicrons wave length in a 10 mm cell on a General Electric spectrophotometer. When this experiment was repeated in exactly the same way except that no hydrazine hydrate was added, light transmittance of the product was 82% when measured in the same manner.

The embodiments of the invention in which an exclusive property or privilege is claimed are defined as follows:

1. In a process for preparing alkyl and alkenyl acid phosphates, and salts thereof, by reacting a $C_4$ to $C_{18}$ alcohol, or mixture of alcohols, with phosphorus pentoxide, to form the acid phosphates, and reacting the acid phosphate formed thereby with a member selected from the group of salt-forming reactants consisting of sodium potassium and lithium hydroxides, and an amine of the formula

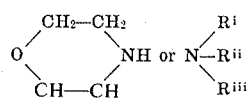

wherein
R$^i$, R$^{ii}$ and R$^{iii}$ are selected from —H, —CH$_3$, —C$_2$H$_4$OH or —C$_3$H$_6$OH with no more than 2 of R$^i$, R$^{ii}$, and R$^{iii}$ being —H or CH$_3$, to form the corresponding salt of the acid phosphate, the improvement which comprises reacting the acid phosphate reactants with a hydrazine of the formula

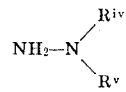

wherein each of R$^{iv}$ and R$^v$ is independently H or an alkyl group having from 1 to 4 carbon atoms.

2. A process according to claim 1 comprising introducing the hydrazine into the alcohol or mixture of alcohols before the addition of the phosphorus pentoxide.

* * * * *